May 14, 1935.  C. N. SCOTT  2,001,551
PLUNGER LIFT APPARATUS
Filed March 15, 1934
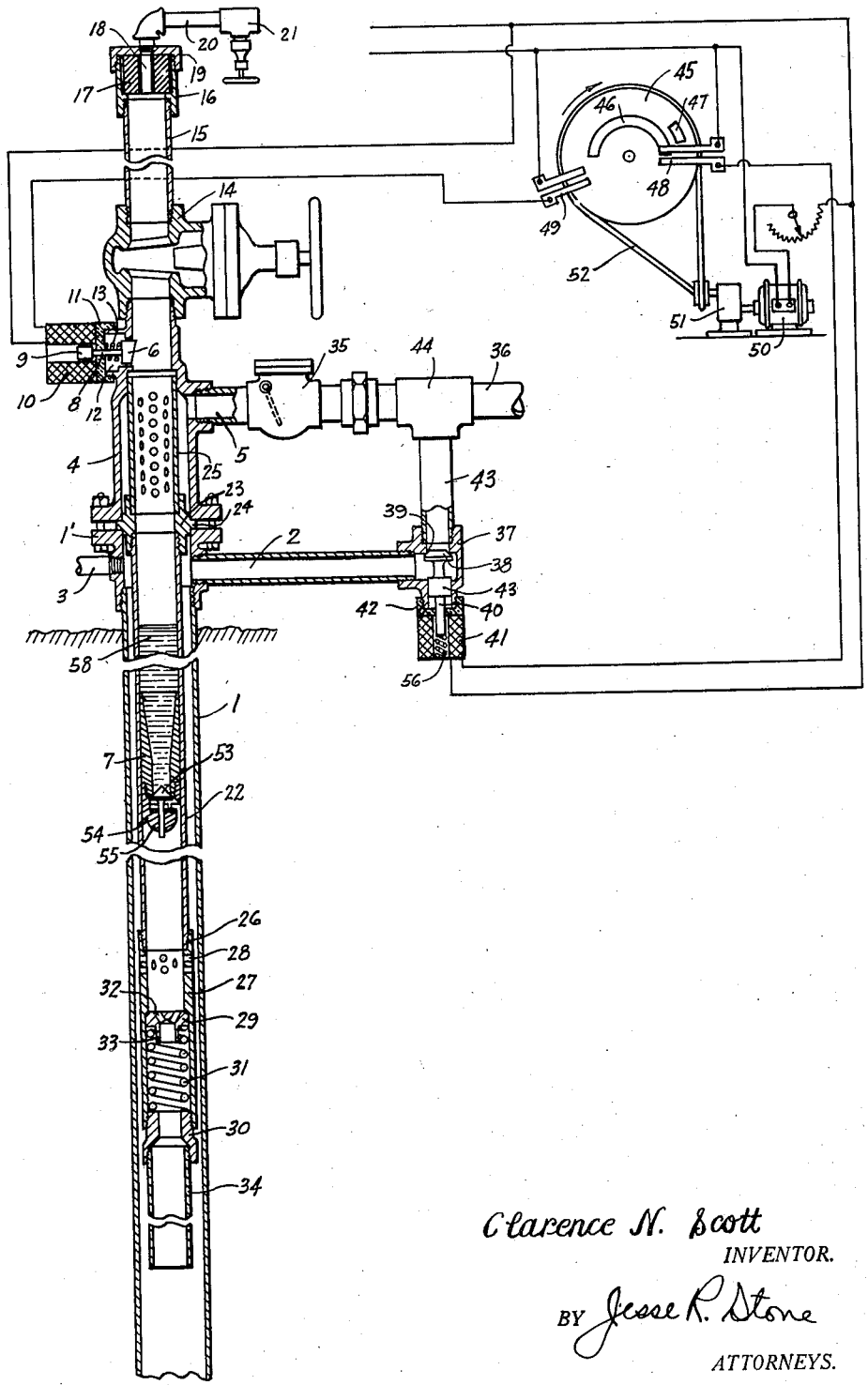
Clarence N. Scott
INVENTOR.
BY Jesse R. Stone
ATTORNEYS.

Patented May 14, 1935

2,001,551

UNITED STATES PATENT OFFICE 2,001,551

PLUNGER LIFT APPARATUS

Clarence N. Scott, Houston, Tex.

Application March 15, 1934, Serial No. 715,648

6 Claims. (Cl. 103—52)

My invention relates to a plunger lift apparatus in which liquid is raised from deep wells through a plunger which travels from the pumping depth to the upper end of the well, carrying with it a load of liquid to be discharged at the surface, said plunger being operated by pneumatic pressure. Devices of this kind are now well known in the art.

It is an object of this invention to provide a method of operation whereby the pressure of the gaseous fluid employed in lifting the plunger with its load, is removed from the producing formation in and adjacent the well during a certain period in the operation of the plunger lift, to increase the flow and accordingly the production of liquid from said well and formation.

It is a further object to provide a method of operation whereby frequent alternating release and reapplication of pressure are effected from and to the producing formation adjacent the well, so that:

(a) The pores and interstices in the said formation may be kept cleared of material tending to pack and to clog the same, and the production of liquid from said well and formation be increased thereby, and;

(b) A violently pulsating flow, in the formation adjacent the well, of the fluid produced therefrom may be secured to free material tending to pack and to clog the pores and interstices of the formation from lodgment therein and flow it into and out of the well with the liquid produced, and the production of liquid from said well and formation be increased thereby, and;

(c) A reversal and meandering of the flow in the said formation, of the fluid produced therefrom, may be secured, resulting in more intimate and more complete circulation of the fluid in and between the oil and gas stratifications and pockets of said formation, to liven the flowing fluid and maintain it in a thoroughly fluid and resilient condition by more complete saturation and absorption and admixture of gas, all resulting in increased production of liquid from said well and formation.

The invention resides particularly in the method of operating the well to obtain:

(a) The said release of pressure or release and reapplication of pressure;

(b) The violently pulsating flow of fluid;

(c) The reversal and meandering of the flow of fluid.

(d) The more complete circulation of the fluid between the oil and gas stratifications and pockets of the producing formation;

(e) The more complete saturation, absorption and admixture of the gas with the liquid produced.

(f) All in the producing formations adjacent the well.

The invention further includes the arrangement of the valves for the control of the pressure fluid so that the desired results may be obtained.

In the drawing herewith, I have disclosed one arrangement of the apparatus whereby my method may be carried out, the device being shown principally in central vertical section.

In the construction of my device I contemplate the use of a well casing 1, which holds up the wall of the well and is intended to be equipped at the lower end with the usual strainer or perforated pipe. The upper end of the casing is formed with a casing head 1, having a lateral outlet 2 for fluid. Opposite the outlet 2 is a pipe connection 3 through which air or gas may be pumped into the well under pressure where additional pressure fluid is desired.

Above the casing head 1 and connected therewith by the usual flange connection is a discharge head 4 for the liquid being pumped. Said discharge head is provided with a lateral outlet 5 for the liquid and above said outlet the head is formed with a latch member 6.

The latch is adapted to engage the plunger 7, which will be later described. The latch comprises a head having an upper shoulder to engage the plunger. Said head is mounted upon a stem 8 having on its outer end a soft iron core 9 adapted to move within a solenoid 10 of ordinary construction. The stem 8 works through a cap 11 of electrical insulating material which closes about the end of the chamber 12 in which the valve is movable. A spring 13 between the head of the valve and the cap 11 tends to hold the valve resiliently inward, and it will be noted that the valve may be withdrawn from plunger-engaging position by energizing the solenoid 10, so as to move the core 9 therein.

Above the discharge head 4 is shown a gate valve 14 and above said valve the tubing extension 15 is engaged. Said tubing extension may be of any desired length and is shown as being connected with a special collar 16 within which is mounted a rubber shock absorber 17 having a central fluid passage 18 therethrough. A cap 19 closes the collar above the shock absorber, said cap having a central opening to receive the vent pipe 20. Said vent pipe has therein a hand operated valve 21, which is normally closed.

Within the casing is an eduction tube 22, said tube being connected at its upper end with a special coupling 23, which has a radial flange 24 adapted to be clamped between the casing head 1 and the discharge head 4, as will be seen from the drawing. Above this coupling is a perforated nipple 25, spaced within the discharge head 4 and connecting at its upper end with the passage leading upward into the tubing extension 15.

The lower end of the eduction tube is connected at 26 with the barrel 27. Said barrel has perforations 28 therein adjacent the upper end and the lower end houses a movable stop member 29 resiliently supported upon the nipple 30 by means of a coil spring 31. Said stop member comprises a disc having perforations 32 therein and having a downwardly directed flange 33 about the inlet passage from the well and about which the spring 31 is fitted. The stop member 29 is limited in its upward movement by an inner shoulder in the barrel. Below the nipple 30 an inlet tube 34 may be extended downwardly the desired distance into the liquid in the well.

The plunger 7 is of the usual construction in devices of this character. It has an upper tubular body with a downwardly tapered passage therein, the lower end of which is controlled by an upwardly closing valve 53 having a stem 54 slidable within a lower supporting member 55. The valve member 53 is normally held open by gravity, the valve being supported upon the upper face of the member 55.

The liquid outlet 5 is shown as having an outwardly opening check valve 35 therein and this pipe is connected through the T 44 with the flow line 36 and through which the fluid may be discharged to the separator or to storage as desired. The pipe 2 leading from the casing allows the discharge of fluid from the space outside of the eduction tube. This pipe is connected to a coupling 37 which forms a housing for the valve 38 adapted to fit within a seat 39 in the upper portion of the coupling 37. Said valve has a downwardly extending stem 40 projecting into a solenoid 41 and said solenoid is separated from the housing by an insulating cap 42. It is to be understood that the enlargement 43 upon the valve stem closes the lower end of the coupling 37 against the escape of fluid, the spring 56 tends to hold the valve closed, and that the stem 40 is of soft iron adapted to be attracted by the energizing of the solenoid 41 to move the valve from its seat 39. The upper end of the coupling 37 is engaged with a pipe 43 connecting said coupling with the T 44 in the flow line. Thus, when the valve 38 is open, gas or other fluid from the well may escape by way of the pipe 43, the T 44, and the flow line 36 to the separator.

The two solenoids 10 and 41 are shown as connected in circuits which include a rotating switch member 45. Said switch member has arcuate contact members 46 and 47 thereon, which are adapted to engage with the terminals 48 upon the circuit including the solenoid 41, and with the terminals 49 in the circuit including the solenoid 10. This switch member is adapted to be rotated by a small motor 50 and speed changing device 51 through the connection made by the belt 52 and is to be understood as operating at a uniform slow predetermined rate.

In the operation of this device, it is to be understood that the plunger at the lower end of its stroke will bring the valve stem 9 into engagement with a stop member 29 and move the valve up to closed position. With the plunger in its lower-most position the inlet openings 28 to the eduction tube will be closed and the opening from the casing by way of the valve 38 will also be closed. Gas from the well and producing formation adjacent thereto and/or from an outside source will accumulate and build up in the space between the casing and the tubing or in a compartment of said space and the liquid which has risen in the well during the previous pressure-reducing period will be moved downwardly in said space. When the level has been depressed so that the gaseous fluid in the casing can enter around the lower end of the tube 34, said fluid will accumulate below the plunger and finally assume sufficient pressure to raise the plunger with its load of liquid at 58 to the surface and discharge the said fluid through the openings in the nipple 25 and through the outlet 5 to the flow line 36. As the plunger starts upwardly, the gas can enter in full force through the openings 28 which, however, are optional and may be omitted, and the plunger will be moved rapidly to the upper end of the tube. When the plunger has passed the openings through which the liquid is discharged from the nipple 25 it will move by its momentum upwardly into the tubing extension 15. This extension will be closed at the upper end and will have therein a certain amount of liquid and air under compression of the plunger. This fluid will exert a back pressure on the valve 53 in the plunger and move it to open position. The plunger will then be caught by the latch member 6 and will remain in position above the outlet 5. The gas behind the plunger will escape through the liquid outlet to the flow line. When the gas has been thus exhausted, the switch will have reached a point bringing the contact member 46 into position to close the gap between the terminals 48 and the solenoid 41 will be energized to open the valve 38. This will allow a rapid discharge of gas remaining in the casing so as to take the pressure away from the formation at and adjacent the bottom of the well. The fluid will then come in at the bottom of the well and the liquid will rise in the casing and tubing to the desired level therein. In this operation the release of fluid pressure in the well will cause a temporary reduction in fluid pressure in the formation adjacent the well and a surge of the gas and liquid in the formation up into the well and will tend to increase the production of liquid from the well.

The valve 38 will be released to allow it to close at a time when the liquid has risen in the casing and tubing to the desired level. At about the same time the solenoid 10 is energized to release the plunger and allow it to fall through the liquid to the stop member 29 where the valve will be closed, and the gaseous pressure in the casing will build up for a second stroke.

By the use of the latch 6 to time the falling of the plunger and the valve 38 to relieve the pressure in the casing, I am enabled to take the pressure off the formation adjacent the well and may even reduce it below atmosphere so as to cause a surge of fluid inwardly into the well. Then, by later building up fluid pressure in the well and depressing the liquid level in same, I move liquid back into the formation displacing gaseous fluid therein. I thus employ the principle of keeping the interstices of the oil sand immediately around the well open by periodic and frequent reversal of the flow of oil in the oil sand and forcing more intimate circulation between the stratifications and pockets of oil and gas in the producing formation and thus keeping the liquid in the producing formation adjacent the well in a more fluid and gas-saturated state.

What I claim as new is:

1. A method of pumping wells having a casing and an eduction tube and having gas under pressure therein, including releasing gaseous fluid pressure from the said casing and tubing to relieve the pressure in the well and in the producing formation adjacent thereto and permit the fluid to flow freely into the well and build up to the desired liquid level in said tubing and casing, dropping a freely moving plunger into said tube, interrupting escape of gas from and building up gaseous fluid pressure in the casing to depress the level of the liquid in said casing, introducing said built-up pressure fluid into said tube below said plunger, raising said plunger with its load of liquid to the surface and discharging said load, retaining said plunger at the upper end of said tube, and again releasing fluid pressure from said tubing and casing and repeating the operation.

2. A method of pumping wells having a casing and an eduction tube and having gas under pressure therein, including building up the level of liquid in the well by reducing the pressure of gaseous fluid above the liquid in said casing and tubing by releasing the gas pressure from said casing and tubing, dropping a freely moving plunger into said tube to a point below the level of liquid in same, interrupting escape of gas from the casing and building up gaseous fluid pressure therein above the liquid to depress the level of liquid in said casing and open the gaseous fluid inlet to the tubing below the plunger, introducing said built-up gaseous pressure fluid into said tube below said plunger, raising said plunger with its load of liquid to the surface and discharging said load, retaining said plunger at the upper end of said tube, and again releasing pressure from said casing and tubing and repeating the operation.

3. A method of pumping wells having a casing and an eduction tube and having gas under pressure therein including dropping a freely moving plunger into said tube to a point below the level of liquid in said tube, interrupting escape of gas from and building up gaseous fluid pressure in the casing to depress the level of the liquid in said casing and force a portion of said liquid into the producing formation, introducing said built-up pressure fluid into said tube below said plunger and raising said plunger with its load of liquid to the surface and discharging said load, retaining said plunger at the upper end of said tube, releasing fluid pressure from said tubing and casing to relieve the pressure in the well and in the producing formation adjacent thereto, and permit the fluid to flow freely into the well and build up in said tube and casing, dropping said plunger and again interrupting escape of gas from and building up a gaseous fluid pressure in the casing.

4. A method of pumping wells having a casing and an eduction tube and having gas under pressure therein including dropping a freely moving plunger into said tube to a point below the level of liquid in said tube, interrupting escape of gas from and building up gaseous fluid pressure in the casing to depress the level of the liquid in said casing and force a portion of said liquid into the producing formation, introducing a limited built-up fluid pressure into the lower end of said tube below said plunger and moving said plunger upwardly, increasing the inlet of built-up pressure fluid below said plunger, and raising said plunger with its load of liquid to the surface and discharging said load, retaining said plunger at the upper end of said tube, releasing fluid pressure from said tubing and casing to relieve the pressure in the well and in the producing formation adjacent thereto and permit the fluid to flow freely into the well and build up in said tubing and casing, dropping said plunger and again interrupting escape of gas from and building up a gaseous fluid pressure in the casing.

5. In the pumping of wells having gas under pressure therein and employing a plunger lift device including a well casing, an eduction tube and a freely moving plunger, the method of operation including dropping said plunger to the lower end of said tube below the liquid level, interrupting escape of gas from and building up a pressure of gaseous fluid in said casing to depress the liquid level in said casing, forcing said plunger with its load to the surface, releasing the fluid pressure from said casing on said formation and in said tube and repeating the operation.

6. In the pumping of wells having gas under pressure therein and employing a plunger lift device including a well casing, an eduction tube and a freely moving plunger, the method of operation including dropping said plunger to the lower end of said tube below the liquid level, interrupting escape of gas from and building up a pressure of gaseous fluid in said casing to depress the liquid level in said casing and force a portion of said liquid into the producing formation, forcing said plunger with its load to the surface, releasing the fluid pressure from said casing on said formation and in said tube and repeating the operation.

CLARENCE N. SCOTT.